United States Patent [19]
Austin et al.

[11] Patent Number: 5,751,127
[45] Date of Patent: May 12, 1998

[54] MAGNET BRAKE

[75] Inventors: Keith G. Austin, Beavercreek; Jorge G. Erazo, Clayton; Terence D. Kirkpatrick, Urbana; Robert E. Giffen, Columbus; Michael A. Forhan, Urbana, all of Ohio

[73] Assignee: Grimes Aerospace Company, Urbana, Ohio

[21] Appl. No.: 745,725

[22] Filed: Nov. 12, 1996

Related U.S. Application Data

[63] Continuation-in-part of Ser. No. 498,926, Jul. 6, 1995, abandoned.

[51] Int. Cl.⁶ .............. F16D 37/02; H02K 49/10
[52] U.S. Cl. .............. 318/370; 188/171; 310/93; 310/104; 318/371
[58] Field of Search .............. 318/360–389; 310/77, 75 D, 93, 103, 104, 216; 188/171; 192/35.52, 21.5; 73/11

[56] References Cited

U.S. PATENT DOCUMENTS

| | | | |
|---|---|---|---|
| 3,579,003 | 5/1971 | Gray | 310/93 |
| 3,664,473 | 5/1972 | Hendershot, Jr. et al. | 192/21.5 |
| 3,680,671 | 8/1972 | Hendershot et al. | 310/216 |
| 3,693,402 | 9/1972 | Jones | 73/11 |
| 3,822,390 | 7/1974 | Janson | 310/104 |
| 3,893,191 | 7/1975 | Gold et al. | 310/76 |
| 4,152,617 | 5/1979 | Janson | 310/103 |
| 4,156,478 | 5/1979 | Kroeger | 188/171 |
| 4,187,603 | 2/1980 | Kroeger | 29/602 R |
| 4,460,076 | 7/1984 | Yamada | 192/35 |
| 4,635,774 | 1/1987 | Seikiguchi et al. | 192/52 |
| 5,121,018 | 6/1992 | Oldakowski | 310/77 |
| 5,154,261 | 10/1992 | Tanaka et al. | 188/171 |
| 5,346,155 | 9/1994 | Alexander et al. | 242/334 |
| 5,465,815 | 11/1995 | Ikegami | 310/93 |
| 5,473,209 | 12/1995 | Lamb | 310/75 D |

*Primary Examiner*—Paul Ip
*Attorney, Agent, or Firm*—Standley & Gilcrest

[57] ABSTRACT

A magnet brake is disclosed. The magnet brake may consist of a stationary magnet assembly and a rotating magnet assembly. The opposing poles on the magnet assemblies have a mutual attraction that biases the assemblies into alignment with each other. The magnet brake may also be combined with Hall-effect switches to provide position and direction detection.

21 Claims, 4 Drawing Sheets

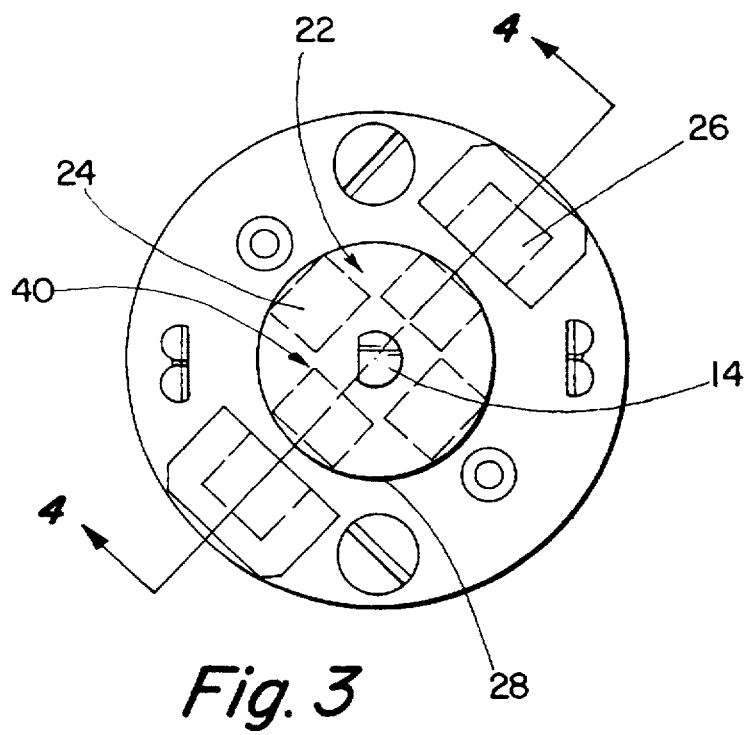
Fig. 3
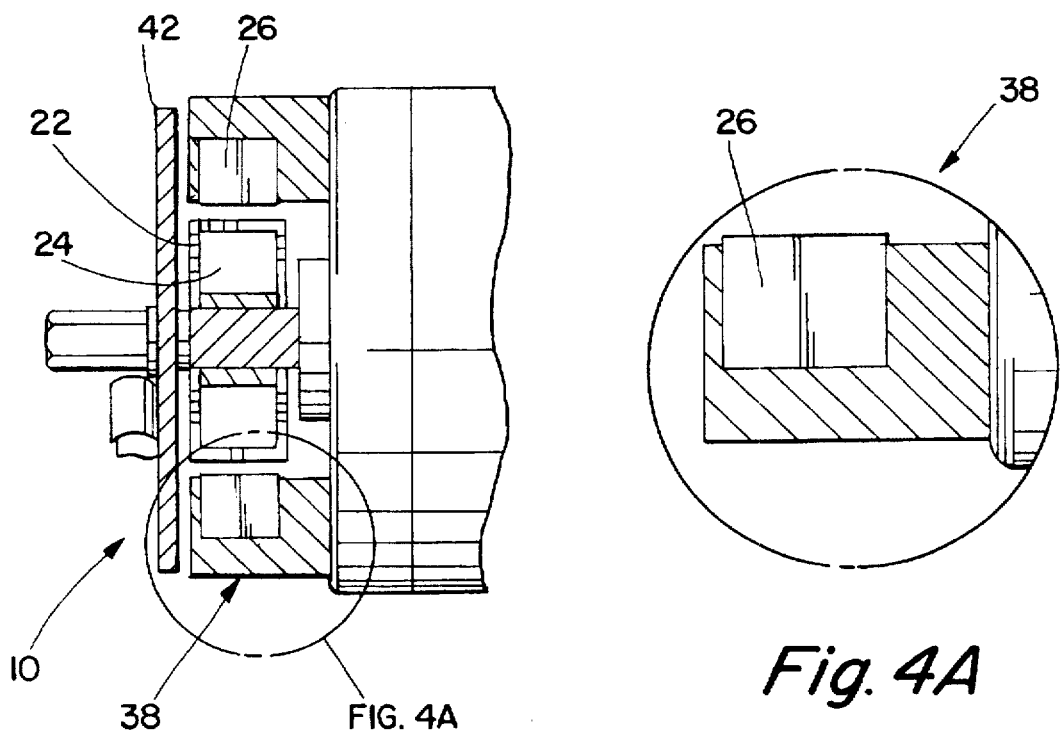
Fig. 4
Fig. 4A

MAGNET BRAKE

This is a continuation-in-part of application Ser. No. 08/498,926 filed Jul. 6, 1995, now abandoned.

BACKGROUND AND SUMMARY OF THE INVENTION

The present invention relates generally to the art of motor brakes and more particularly to an arrangement for braking a motor with a set of multi-pole magnets.

Motion control applications frequently consist of a high speed, low torque motor which drives a gear reduction mechanism. The output of a gear reduction is low speed, high torque. An electromechanical brake assembly is commonly affixed to the motor shaft as an aid to position controls. Such an electromechanical brake assembly serves to stop the motor quickly when the desired position is reached and to hold the output position in place against an opposing load.

Electromechanical brakes consist of a solenoid which acts against a spring-loaded friction disk. Power is applied to the solenoid to pull the friction disk away from a stationary mating disk, allowing the motor to operate freely. Braking action is accomplished when power is removed from the solenoid, allowing the spring to push the stationary friction disk against the rotating plate.

The electromechanical brake typically provides low values of holding torque at the motor. This holding torque is then amplified by the gear reduction ratio of the gear train, providing a significant force at the output.

An electromechanical brake has a number of problems. Electromechanical brakes have a number of precision parts that require precision alignment. The friction plates used by electromechanical brakes wear and require periodic replacement. The friction plate wear can also degrade the function of the solenoid and cause unreliable operation. The present invention is designed to overcome these disadvantages.

The present invention is a multi-pole magnet assembly. One of the multi-pole magnets remains stationary while a matching multi-pole magnet may be connected to a motor shaft. In operation, the poles on the rotating magnet assembly will oppose like poles on the stationary magnet, and will be attracted to opposing poles. This causes a "cogging" action whereby the magnets tend to hold the motor shaft in a position where the two magnet assemblies are in attractive alignment. However, the cogging action is not sufficient to prevent proper motor operation. The small holding force, as in electromechanical brakes, is amplified many times by the gear reduction mechanism to hold the output position in place against an opposing load.

In addition, the present invention may serve as an actuator for a two-channel incremental encoder. Two Hall-effect switches may be positioned relative to the multi-pole magnets to actuate in quadrature. This embodiment allows direction sensing in addition to incremental position counting. Alternatively, a single Hall-effect switch could be used for incremental position encoding.

Multi-pole magnets are commonly available and provide a low cost, long-life solution for motion control applications requiring a holding brake, regardless of motor type. When used in combination with motor dynamic braking controls, motor "coast" is minimized and an effective position control braking system can be implemented.

The present invention has a specific application as a magnetic brake for a retractable landing light assembly. Landing lights on aircraft are lowered during landing. Without proper braking or support, the lowered landing lights are forced back into the plane from the high torque caused by the wind outside the plane. This forced retraction of the landing lights disrupts the flight pattern and may cause landing problems due to the retracted position of the landing lights (i.e., the pilot would not be able to see the runway). The present invention prevents forced retraction of the landing lights by using a magnetic braking assembly. The magnet brake of the present invention holds the landing light in the lowered position after the motor has been turned off. The magnetic brake of the present invention is advantageous in that:

i) it has fewer parts than traditional electromechanical brakes;

ii) the braking components are not connected (no friction) which leads to longer lasting, more reliable parts;

iii) the magnetic holding force can be overridden by the motor;

iv) the magnetic fields created by the magnets allows for shaft (and landing light) position and direction sensing; and v) it allows for cost efficient, more reliable braking and stabilization of mechanical parts.

Other principal features and advantages of the invention will become apparent to those skilled in the art upon review of the following detailed description, claims and drawings.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which:

FIG. 3 illustrates an end view of the magnetic brake assembly of FIG. 2, viewed from angle B-B;

FIG. 4 illustrates a cross-sectional view of the magnetic brake assembly of FIG. 3 as viewed from angle A—A;

DETAILED DESCRIPTION OF PREFERRED EMBODIMENTS

The preferred system herein described is not intended to be exhaustive or to limit the invention to the precise forms disclosed. They are chosen and described to explain the principles of the invention, and the application of the method to practical uses, so that others skilled in the art may practice the invention.

Figure 1:
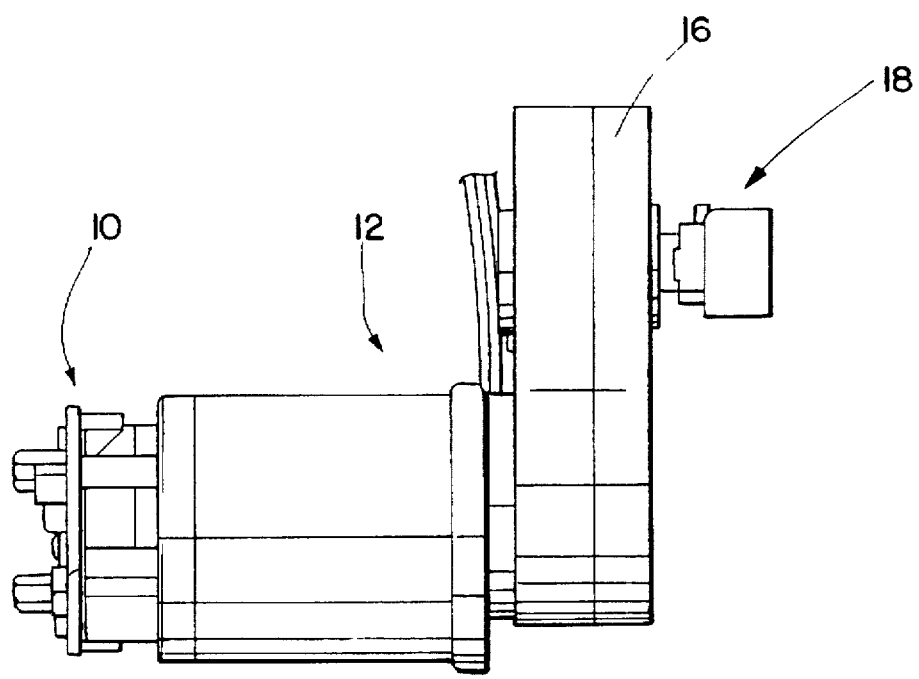
FIG. 1 illustrates a magnetic braking assembly of the present invention in conjunction with a gear motor.
Figure 2:
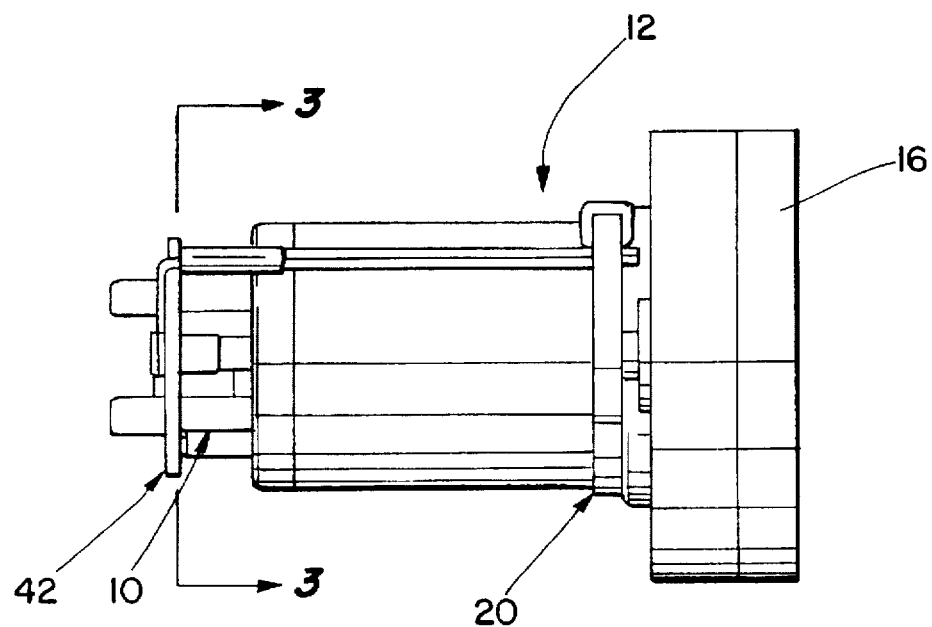
FIG. 2 illustrates another view of the magnetic braking assembly of the present invention.

FIG. 1 illustrates a magnetic braking assembly 10, or magnet brake, of the present invention in conjunction with a motor 12, having an output shaft 14, a gear reduction assembly 16, and an output gear 18. The gear reduction assembly 16 is connected to one side of the motor's output shaft 14. The gear reduction assembly 16 transfers the output of the shaft 14 to the output gear 18. FIG. 2 illustrates another view of the magnetic brake assembly 10 of the present invention.

FIG. 3 illustrates an end view of the magnetic brake assembly 10 as viewed from angle B—B of FIG. 2. It is preferred that the magnetic brake assembly 10 of the present invention 10 have a magnetic rotor assembly 22 secured to the motor shaft 14. The rotor assembly 22 holds, preferably, four multi-pole magnets 24 positioned symmetrically around the output shaft 14. It is preferred that the opposite facing multi-pole magnets of the rotor assembly 22 have the same polarity as indicated in FIG. 3. (i.e. The opposite facing multipole magnets 24 have the same polarity with respect to a radial axis-or in otherwords, they are positioned to have the same polarity side or faces pointed away from each other.) The rotor assembly 22 (the rotor assembly 22 is merely a support for the multi-pole magnets 24 as they rotate around the shaft 14) rotates around the output shaft 14 at speeds which are dependent on various parameters such as motor and shaft size. Stationary magnets 26 are positioned adjacent to the rotating multi-pole magnets 24. It is preferred that two stationary magnets 26 be placed adjacent to opposite points of the rotor assembly perimeter 28. The stationary magnets 26 are positioned so as to be axially aligned (a radial axis with a point of reference starting at the motor shaft 14) with the multi-pole magnets 24 (see FIG. 3). Or in otherwords, a first stationary magnet 26 is spaced from one of the multi-pole magnets 24 so that the magnetic field of the multi-pole magnet 24 interacts to bias the multi-pole magnet 24 into polar alignment with the stationary magnet 24 (again, magnets of opposite-facing polarity attract) It is preferred that the stationary magnets 26 also be multi-pole magnets. The two stationary magnets 26 have the same polarity with respect to a radial axis (see FIG. 3) (i.e. the stationary magnets 26 are positioned to have their facing sides have the same polarity).

Each of the first multi-pole rotor magnets 24 have at least one north pole and at least one south pole. Again, in the preferred embodiment (see FIG. 3) the multi-pole magnets 24 have poles facing out in an alternating pole orientation. It is preferred that the stationary magnets 26 have an orientation with the north pole facing toward the multi-pole magnets 24 (although the device would work equally well with both stationary magnets 26 having south poles facing in).

The output of the gear reduction mechanism 16, which is connected to the motor 12, is preferably low speed, high torque (as opposed to the high speed, low torque, motor 12). The load, a landing light 30 for example, connected to the output gear 18, may be lowered at a slow, controlled, speed and experiences high torque. The magnet brake assembly 10, which is connected to the motor shaft 14, may be used to hold the load in a stable position. The magnetic brake assembly 10 experiences low torque from the load (e.g. a landing light) and thus less force is needed at the location of the magnetic brake assembly 10 to hold the load in a stable position. It is preferred that the magnet brake assembly 10 have at least one Hall-effect switch 32 positioned to enable the multi-pole magnets 24 to actuate the Hall-effect switch 32. The Hall-effect switch 32 is actuated when it receives a magnetic signal of predetermined polarity (from one of the multi-pole magnets 24 in the rotor assembly 22). The Hall-effect switch 32 closes causing an electrical pulse at an output which may be monitored to count the number of pulses generated. Accordingly, the number of revolutions of the shaft 14 may be counted. Additionally, by counting the number of pulses generated by the Hall-effect switch 32, the number of revolutions of the shaft 14 can be determined which will give an accurate position of the load or landing light 30.

In the preferred embodiment, a second Hall-effect switch 32 is preferably placed 130 degrees circumferentially from the first Hall-effect switch 32. This second Hall-effect switch 32 allows for direction sensing of the motor shaft 14 rotation. By connecting the outputs of the first and second Hall-effect switches 32 to a pulse monitoring device, the direction of rotation of the shaft 14, and accordingly the load, can be monitored.

Figure 6:
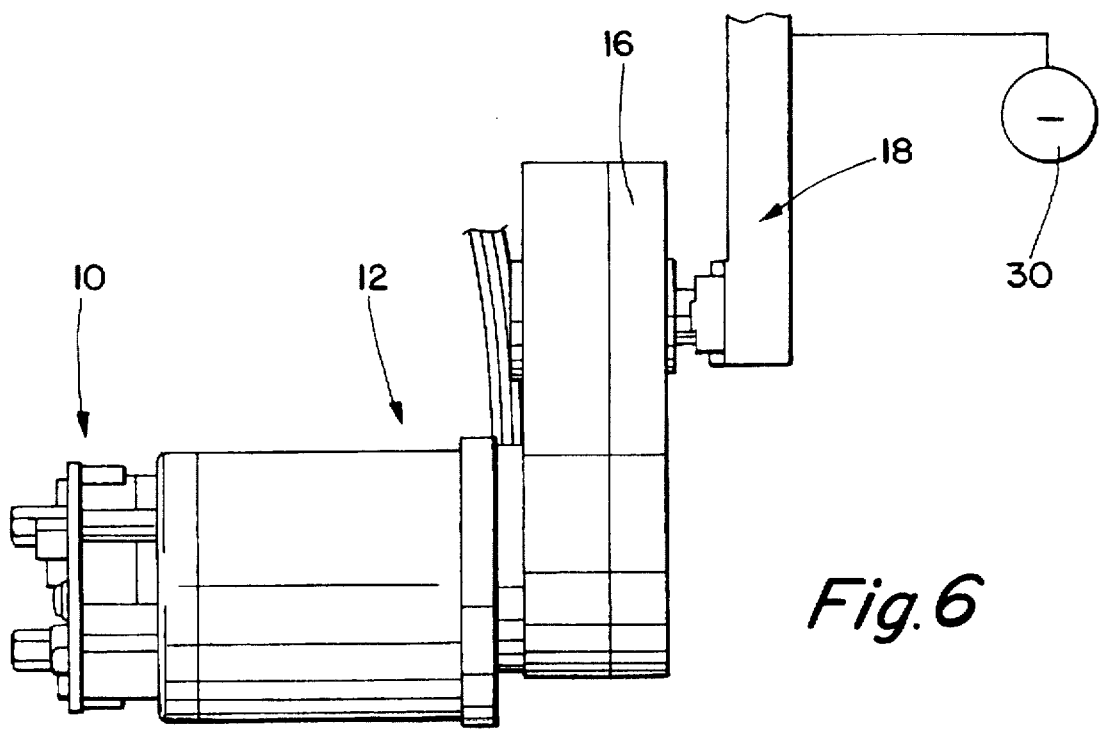
FIG. 6 illustrates a magnetic brake assembly used in conjunction with a retractable landing light.
Figure 7:
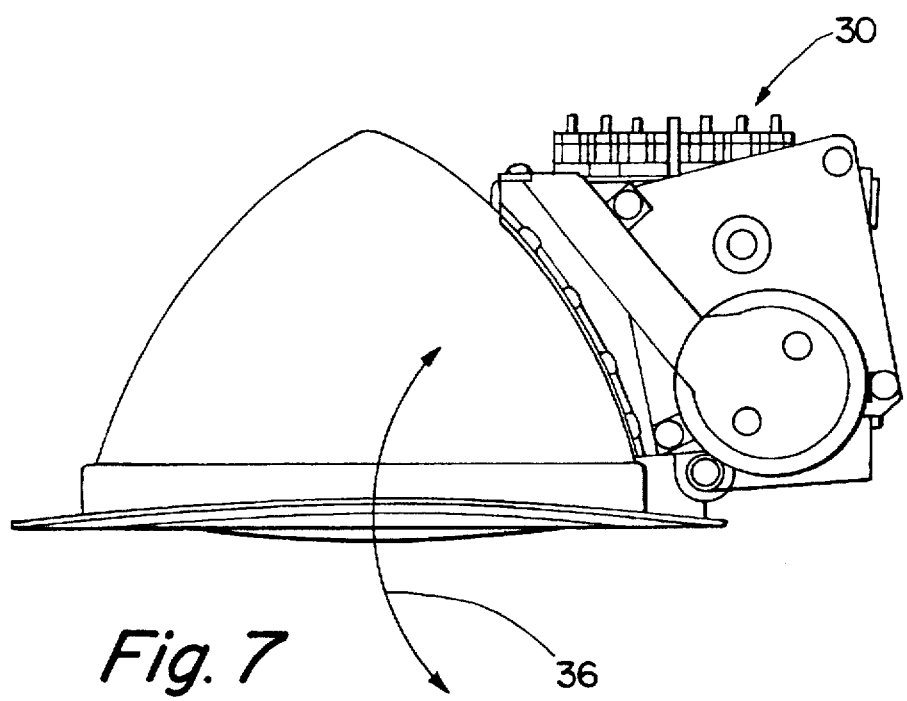
FIG. 7 illustrates an example of a landing light which may be held in a stable position with the magnetic brake assembly of the present invention.
Figure 8:
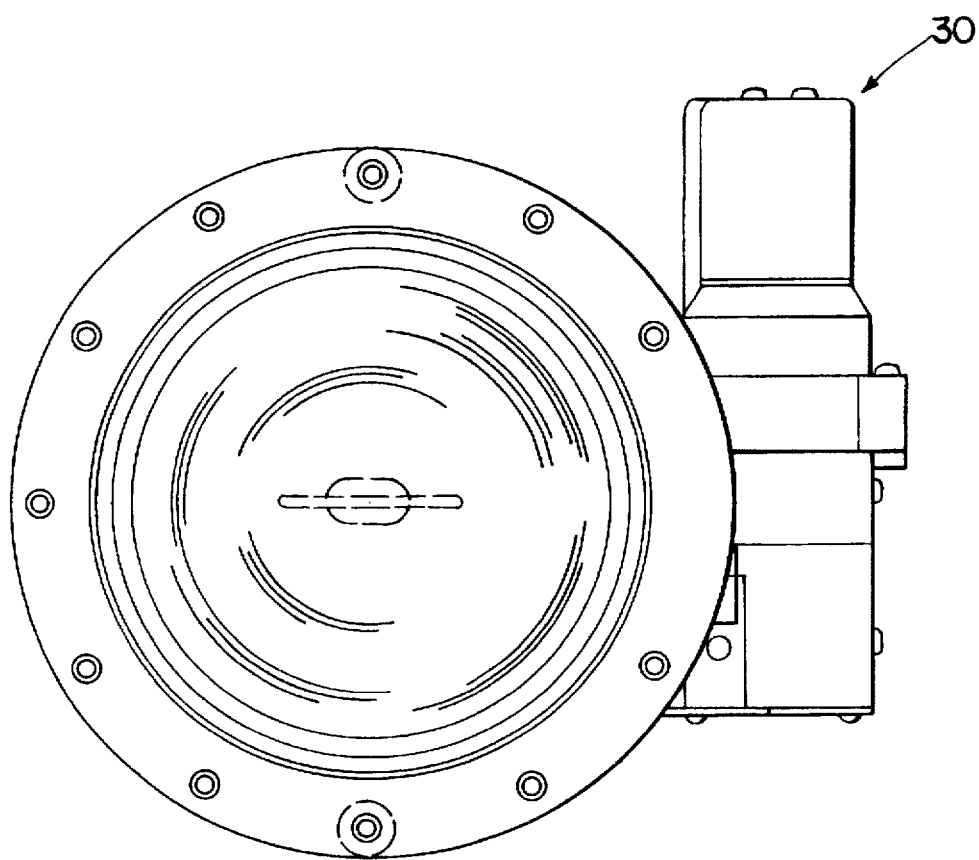
FIG. 8 illustrates a plan view of the landing light of FIG. 7.

The magnetic brake 10 of the present invention works in conjunction with a motor 12 which is connected to a gear reduction assembly 16 having an output gear 18 which controls a load (e.g. a landing light 30.) If the landing light 30 is to be lowered, the motor 12 actuates the shaft 14 which rotates. The rotation caused by the motor 12 overrides the low torque of the magnetic brake 10 allowing the shaft 14 to rotate. As the shaft 14 rotates, the gear reduction assembly 16 transfers the power of the motor 12 to the output gear 18. The output gear 18, actuated by the motor shaft 14, rotates which in turn moves the load. Once the light 30 is fully lowered, the Hall-effect switch 32 preferably counts the number of rotations of the shaft 14 and cuts off the motor 12 at the predetermined interval. As the motor 12 is cut, the load (e.g. landing light 30) comes to a slow stop (the load stoppage is caused by the combination of wind force, the magnetic brake, and preferably dynamic braking-dynamic braking is known in the art). Once the load is close to a complete stop, one of the multi-load magnets 24 in the rotor 22, which is of opposite polarity to the facing side of one of the stationary magnets 26, magnetically links with a stationary magnet 26. This magnetic attraction holds the load (e.g. landing light 30) in a stable position. FIGS. 7 and 8 illustrate an example of a landing light used with the present invention. The arrow 36 illustrates the direction of motion of the landing light 30. The landing light 30 is preferably connected to the output gear 18 so that it may be lowered and raised by the rotation of the shaft 14. FIG. 6 illustrates an example of a magnetic brake assembly 10 used in conjunction with a retractable landing light 30.

For retracting the landing light 30, the motor 12 is again started, rotating the shaft in the reverse direction. Again the motor 12 overrides the low torque braking of the magnetic brake assembly 10 allowing load retraction.

FIG. 4 illustrates a cross-sectional view of the magnetic brake assembly of FIG. 3 as viewed from angle A—A. As illustrated, the multi-pole magnets 24 of the rotor 22 are adjacent to the stationary magnets 26 (i.e. in magnetic relationship with respect to each other). The stationary magnets 26 are preferably held in place by a stationary magnet assembly 38. It is also preferred that the rotor have a steel focus plate 40 securably bonded to each of the multi-pole magnets 24.

It is preferred that the magnetic rotor assembly 22 be secured to the shaft 14 by a thin, uniform, coating of adhesive. The stationary magnet assemblies 38 may also be adhesively applied to the magnetic brake assembly 10. The gap between the rotor assembly 22 and the stationary magnets 26 will vary depending on the size of the assemblies, the size of the load, and other various factors. By varying the gap dimension, the holding or braking torque is directly controlled. If the gap is increased, the braking torque is rapidly decreased, and vice versa. This allows for precise holding or braking control.

In the preferred embodiment, the magnetic brake assembly 10 is further comprised of a circuit card assembly 42 secured to the shaft 14 and which rests over the rotor 22 and stationary magnets 26. In the preferred embodiment, the circuit assembly 42 securably mounts the first and second Hall-effect switches 32 and contains the output leads for the Hall-effect switches 32.

Figure 5:
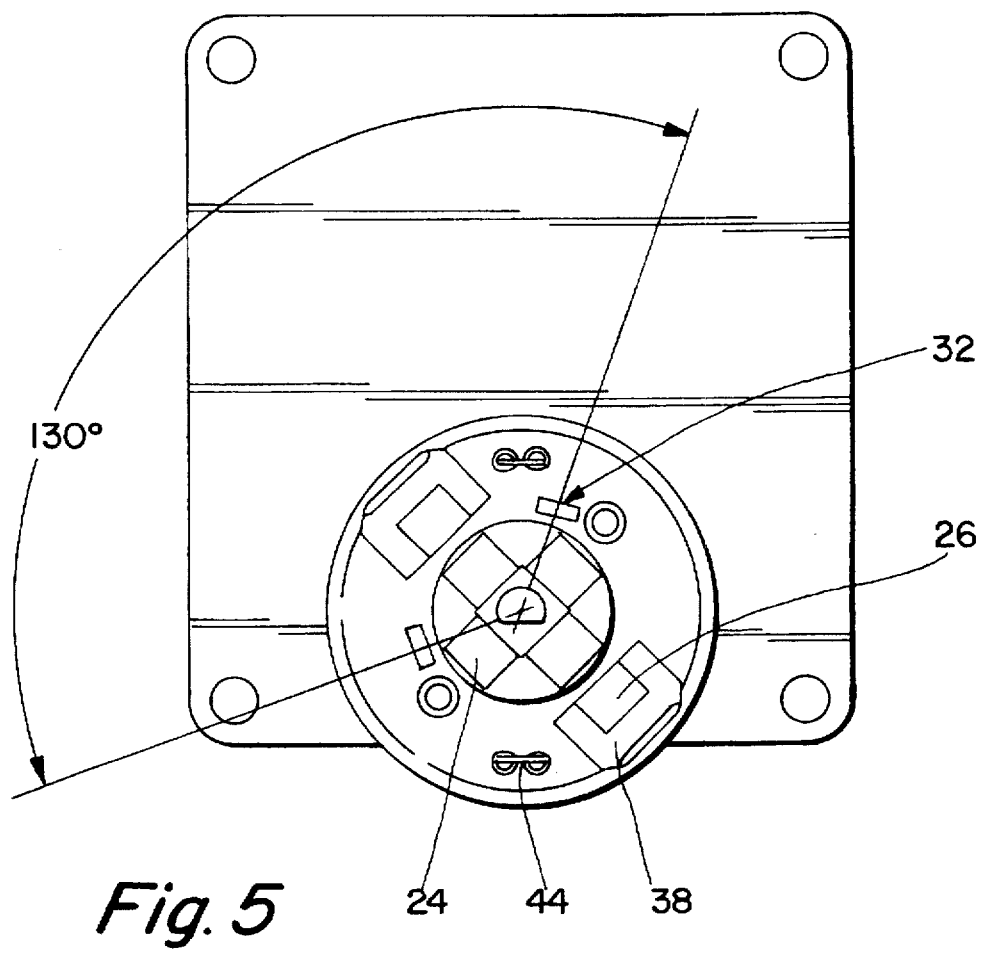
FIG. 5 illustrates an end view of the magnetic brake assembly of the present invention.

FIG. 5 illustrates an end view of the magnetic brake assembly 10 of the present invention. The positioning of the Hall-effect switches 32 is shown clearly. A power terminal 44 of the motor 12 is also depicted.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A magnet brake for attachment to a shaft of a motor, comprising:

a rotor assembly engaged to said shaft;

at least one multi-pole magnet contained within said rotor assembly, said at least one multi-pole magnet being rotatable with said shaft;

a first stationary magnet separated by a fixed distance from said at least one multi-pole magnet so that the magnetic field of said first stationary magnet attracts said at least one multi-pole magnet with opposite-facing polarity, wherein said first stationary magnet and said at least one multi-pole magnet act to hold said shaft in a stopped position while said motor is not driving said shaft and act to allow said motor to drive said shaft when said motor exerts sufficient force to overcome said magnetic hold on said shaft; and wherein said first stationary magnet holds said at least one multi-pole magnet against a load torque.

2. The magnet brake of claim 1, wherein each of said first multi-pole magnets comprises at least one north pole and at least one south pole.

3. The magnet brake of claim 1, wherein there are four multi-pole magnets positioned symmetrically around said shaft of said motor, and which rotate around said shaft via said rotor assembly; and wherein multi-pole magnets positioned opposite each other have the same polarity with respect to a radial axis.

4. The magnet brake according to claim 3, further comprising:

a second stationary magnet in magnetic communication with said four multi-pole magnets and positioned opposite said first stationary magnet; and wherein said first and second stationary magnets have the same polar orientation with respect to a radial axis.

5. The magnet brake of claim 1, further comprising:

at least one Hall-effect switch positioned to enable each of said multi-pole magnets to actuate said Hall-effect switch.

6. The magnet brake of claim 5, further comprising:

a second Hall-effect switch positioned to allow actuation by each of said multi-pole magnets, said second Hall-effect switch positioned 130 degrees circumferentially from said first Hall-effect switch, said second Hall-effect switch for allowing direction sensing.

7. An apparatus comprising:

a motor having a shaft;

a rotor secured to said shaft;

at least one multi-pole magnet secured to said rotor, said at least one multi-pole magnet being rotatable with said shaft; and at least one stationary magnet separated by a fixed distance from said at least one multi-pole magnet and in magnetic relationship with said at least one multi-pole magnet, wherein said at least one stationary magnet and said at least one multi-pole magnet are not in contact with each other or with any other brake component, and wherein said stationary magnet holds said at least one multi-pole magnet of opposite-facing polarity in position against an opposing load.

8. An apparatus according to claim 7, wherein said motor can override said magnetic relationship between said stationary magnet and each of said multi-pole magnets secured to said rotor.

9. An apparatus according to claim 7, wherein there are four multi-pole magnets, wherein said four multi-pole magnets are securably attached to said rotor in symmetrical position around said motor shaft, wherein opposite positioned multi-pole magnets have a same polar orientation with respect to a radial axis.

10. An apparatus according to claim 7, further comprising:

a steel focus plate securably bonded to each of said multi-pole magnets.

11. An apparatus according to claim 7, further comprising stationary magnet assembly for holding said stationary magnets.

12. An apparatus according to claim 7, wherein said at least one multi-pole magnet is a nickel coated neodymium iron magnet.

13. An apparatus according to claim 7, further comprising:

a first Hall-effect switch positioned to enable said multi-pole magnets to actuate said first Hall-effect switch, said first Hall-effect switch for incremental position sensing.

14. An apparatus according to claim 13, further comprising:

a second Hall-effect switch positioned to enable said multi-pole magnets to actuate said second Hall-effect switch, said first and second Hall-effect switches for direction sensing.

15. An apparatus according to claim 14, wherein said second Hall-effect switch is located 130 degrees circumferentially from said first Hall-effect switch.

16. An apparatus according to claim 14, wherein each of said multi-pole magnets have magnetic fields which radiate radially outward with respect to the center of said motor shaft.

17. An apparatus according to claim 16, further comprising a circuit card assembly secured to said shaft and which rests over said rotor and stationary magnets, said circuit assembly for securably mounting said first and second Hall-effect switches.

18. An apparatus according to claim 7, wherein there are two stationary magnets positioned opposite each other, said two stationary magnets having the same polarity with respect to a radial axis.

19. An apparatus according to claim 7, further comprising:

a gear reduction assembly attached to said motor shaft, said gear reduction assembly having an output.

20. An apparatus according to claim 19, further comprising:

an aircraft landing light assembly attached to the output of said gear reduction assembly.

21. A landing light assembly comprising:

a motor having a shaft;

a rotor secured to said shaft;

four multi-pole magnets, wherein said four multi-pole magnets are securably attached to said rotor in symmetrical position around said motor shaft, wherein said opposite positioned multi-pole magnets have a same pole orientation with respect to a radial axis;

two stationary magnets, positioned opposite each other, said two stationary magnets in magnetic relationship with each of said multi-pole magnets, wherein said stationary magnets hold each of said multi-pole magnets of opposite-facing polarity in position against an opposing load;

a stationary magnet assembly for holding said stationary magnets;

a steel focus plate securably bonded to each of said multi-pole magnets;

a first Hall-effect switch positioned to enable said multi-pole magnets to actuate said first Hall-effect switch, said first Hall-effect switch for incremental position sensing;

a second Hall Effect switch positioned to enable said multi-pole magnets to actuate said second Hall-effect switch, said first and second Hall-effect switches for direction sensing;

a gear reduction assembly attached to said motor shaft;

a landing light assembly attached to the output of said gear reduction assembly;

wherein said motor can override said magnetic relationship between said stationary magnet and each of said multi-pole magnets secured to said rotor; and wherein said second Hall-effect switch is located 130 degrees circumferentially from said first Hall-effect switch.

* * * * *

UNITED STATES PATENT AND TRADEMARK OFFICE
CERTIFICATE OF CORRECTION

PATENT NO. : 5,751,127
DATED      : May 12, 1998
INVENTOR(S) : Austin, et al

It is certified that error appears in the above-indentified patent and that said Letters Patent is hereby corrected as shown below:

In column 6, line 34, before the word "stationary", please insert the word -- a --.

Signed and Sealed this

Eighteenth Day of August, 1998

Attest:

BRUCE LEHMAN

Attesting Officer

Commissioner of Patents and Trademarks